(12) United States Patent
Mohan et al.

(10) Patent No.: US 8,735,178 B2
(45) Date of Patent: May 27, 2014

(54) WITHANOLIDES, PROBES AND BINDING TARGETS AND METHODS OF USE THEREOF

(75) Inventors: Royce Mohan, Lexington, KY (US); Paola Bargagna-Mohan, Lexington, KY (US); Kyung Bo Kim, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 1342 days.

(21) Appl. No.: 11/674,947

(22) Filed: Feb. 14, 2007

(65) Prior Publication Data

US 2008/0207574 A1 Aug. 28, 2008

Related U.S. Application Data

(60) Provisional application No. 60/785,972, filed on Mar. 27, 2006.

(51) Int. Cl.
*G01N 33/532* (2006.01)
*G01N 33/534* (2006.01)
*G01N 33/533* (2006.01)

(52) U.S. Cl.
USPC .......................... 436/544; 436/545; 436/546

(58) Field of Classification Search
None
See application file for complete search history.

(56) References Cited

U.S. PATENT DOCUMENTS

| | | | |
|---|---|---|---|
| 5,716,787 | A | 2/1998 | Dunn et al. |
| 6,300,096 | B1 | 10/2001 | Stahl et al. |
| 6,306,610 | B1 | 10/2001 | Bawendi et al. |
| 6,846,841 | B2 | 1/2005 | Hunter et al. |
| 7,132,245 | B2 | 11/2006 | Rose et al. |
| 7,175,844 | B2 | 2/2007 | King |
| 2003/0148485 | A1 | 8/2003 | Taupier et al. |
| 2005/0197338 | A1 | 9/2005 | Huang et al. |
| 2006/0246158 | A1 | 11/2006 | Nair et al. |

OTHER PUBLICATIONS

Jeffery et al. Chemical proteomics and its application to drug discovery. Current Opinion in Biotechnology,2003, vol. 14, pp. 87-95.*
Pierce Catalog. Avidin-biotin Products. Pierce Biotechnology Inc. 2005, pp. 1-39.*
Tohda et al. Scientific basis for the anti-dementia drugs of constituents from *Ashwagandha* (*Withania somnifera*). J. Trad. Med. 2005, vol. 22, pp. 176-182.*
Kaur et al. A biologically active constituent of *Withania somnifera* (*Ashwagandha*) with anti-stress activity. Indian Journal of Clinical Biochemistry 2001, vol. 12, No. 2, pp. 195-198.*
Sharada et al. Antitumor and radiosensitizing effects of withaferin A on mouse ehrlich ascites carcinoma in vive. Acta Oncologica, 1996, vol. 35, No. 1, pp. 95-100.*
Bar, H., et al., "The biology of desmin filaments: how do mutations affect their structure, assembly, and organisation?," J. Struct. Biol. 148, 137-152 (2004).
Eckes, B., et al., "Impaired wound healing in embryonic and adult mice lacking vimentin," J. Cell Sci. 113, 2455-2462 (2000).
Falsey, R.R., et al., "Actin microfilament aggregation induced by Withaferin A is mediated by annexin II," Nat. Chem Biol. 2, 33-38 (2006).
Hertig, A., et al., Risk factors for early epithelial to mesenchymal transition in renal grafts, Am J Transplant; Dec. 2006; 6(12):2937-46.
Jeffery, D.A. and Bogyo, Matthew, "Chemical proteomics and its application to drug discovery," Current Opinion in Biotechnology 2003, 14:87-95.
Leslie, Benjamin J. and Hergenrother, Paul J., "Identification of the cellular targets of bioactive small organic molecules using affinity reagents," Chem. Soc. Rev. (2008).
Mor-Vaknin, N., et al., "Vimentin is secreted by activated macrophages," Nat Cell Biol. Jan. 2003; 5(1):59-63.
van Beijnum, J.R., et al., "Gene expression of tumor angiogenesis dissected: specific targeting of colon cancer angiogenic vasculature," Blood 108, 2339-2348 (2006).
Verardo, M., et al., "Abnormal Reactivity of Mueller Cells After Retinal Detachment in Mice Deficient in GFAP and Vimentin," Invest. Ophthalmol. Vis. Sci., first published on May 9, 2008 as Manuscript iovs.07-1474.
Yokota, Y., et al., "Development of Withaferin A analogs as probes of angiogenesis," Bioorg. Med. Chem. Lett. 16, 2603-2607 (2006).

\* cited by examiner

*Primary Examiner* — Shafiqul Haq
(74) *Attorney, Agent, or Firm* — Stites & Harbison PLLC; Mandy Wilson Decker; Stephen J. Weyer

(57) ABSTRACT

Novel withanolide chemical genetic probes identify the in vivo binding target of withaferin A, which is the intermediate filament type III protein vimentin. In addition, a withanolide-based small molecule screening method screens drug candidates that target intermediate filament type III proteins. The method includes introducing a tagged linker covalently bonded to the withanolide molecule to form a withanolide probe. Better or alternative small molecule compounds as potential drug candidates can be generated based on their likely affinity for the determined binding site in vimentin. The affinity labeled withanolide can also be used to find intermediate filament-associated proteins using chemical proteomics by extracting proteins from cells that were exposed to withanolide-biotin analog. The withanolide probes can be used to monitor expression of vimentin, in tumor samples or other diseased tissues. Withaferin analogs can be used as a treatment for diverse vimentin-associated disorders, such as cancers, angiofibrotic diseases, and chronic inflammation.

16 Claims, 9 Drawing Sheets

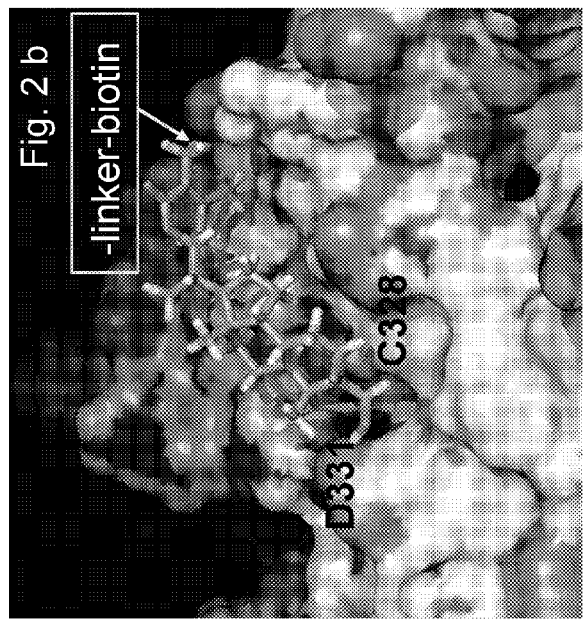
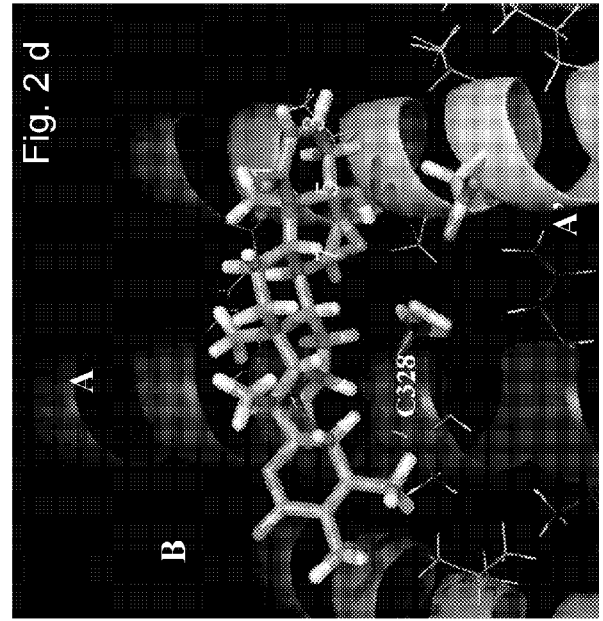
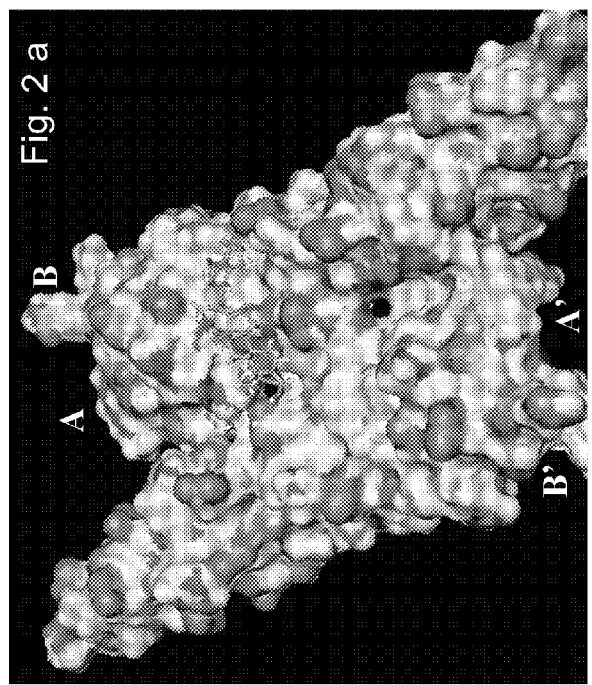
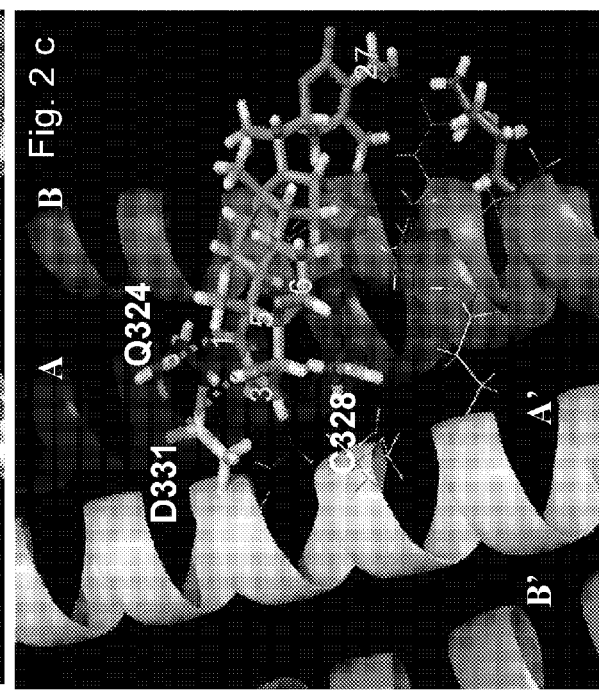

Fig 3 a 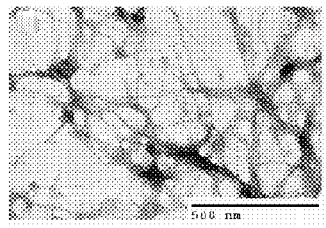 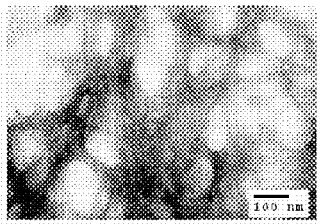 Fig 3 b
Fig. 3 c 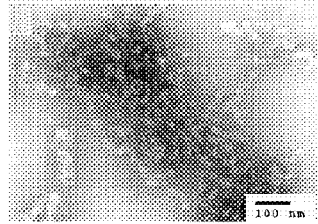 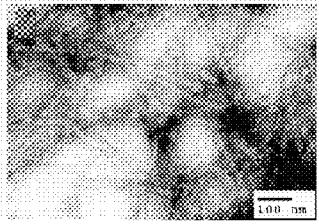 Fig. 3 d
Fig. 3 e 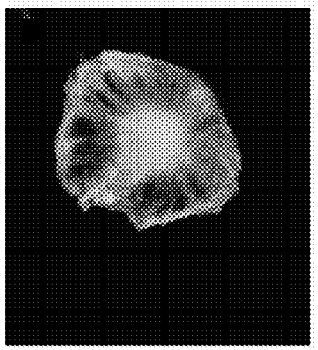 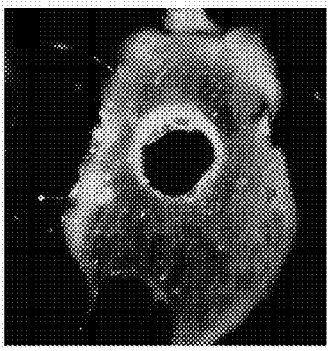 Fig. 3 f
Fig. 3 g 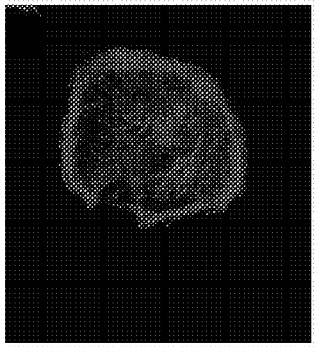 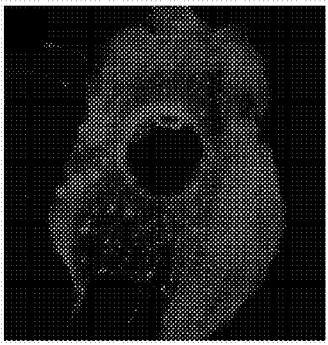 Fig. 3 h
Fig. 3 i 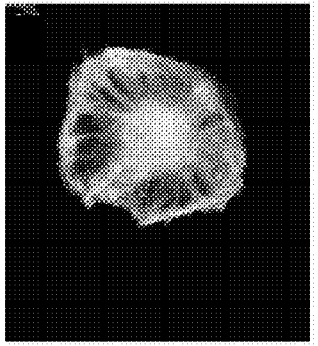 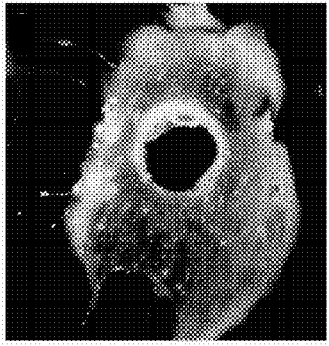 Fig. 3 j

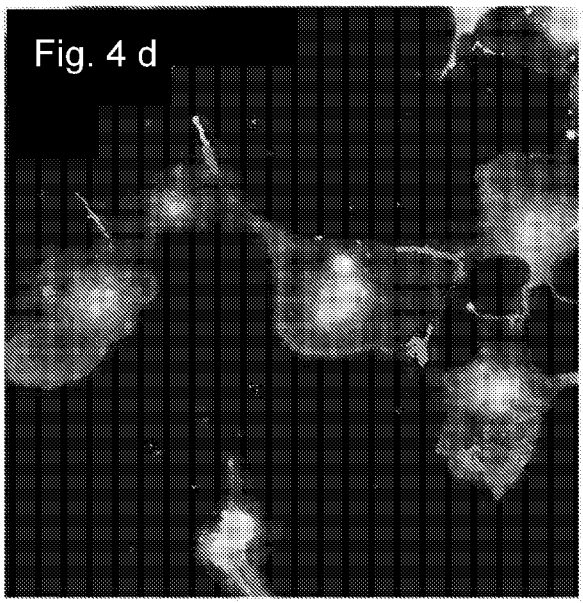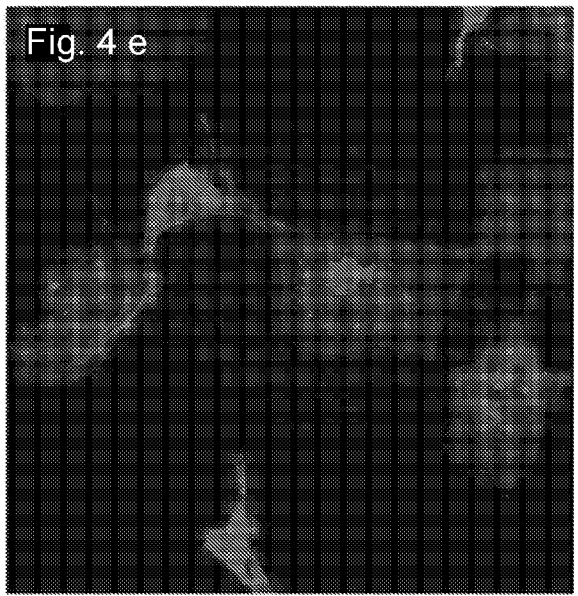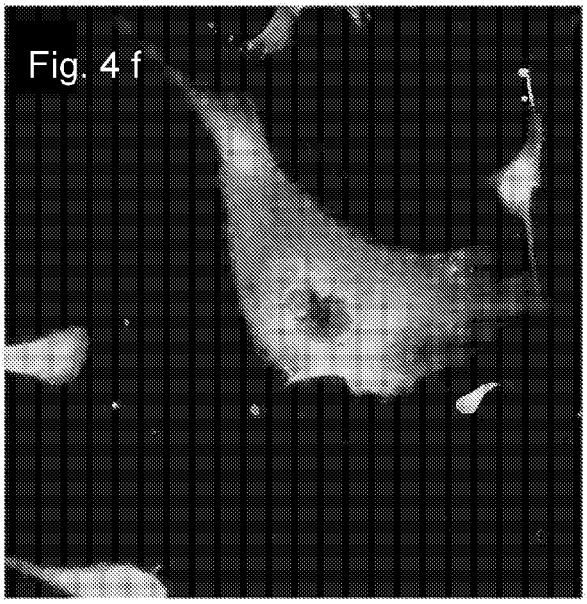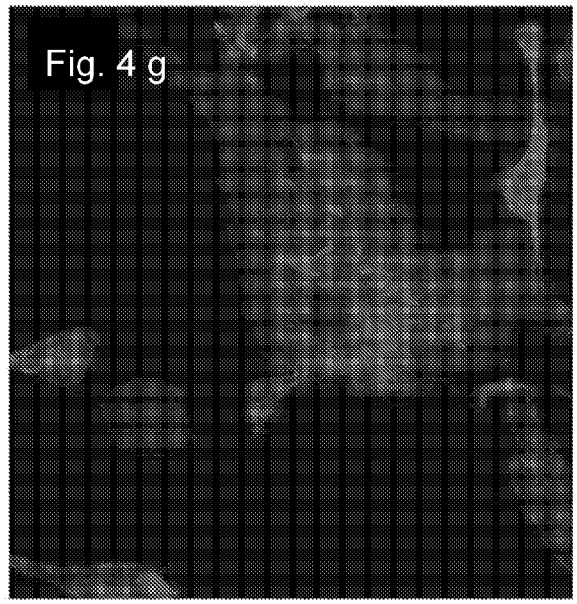

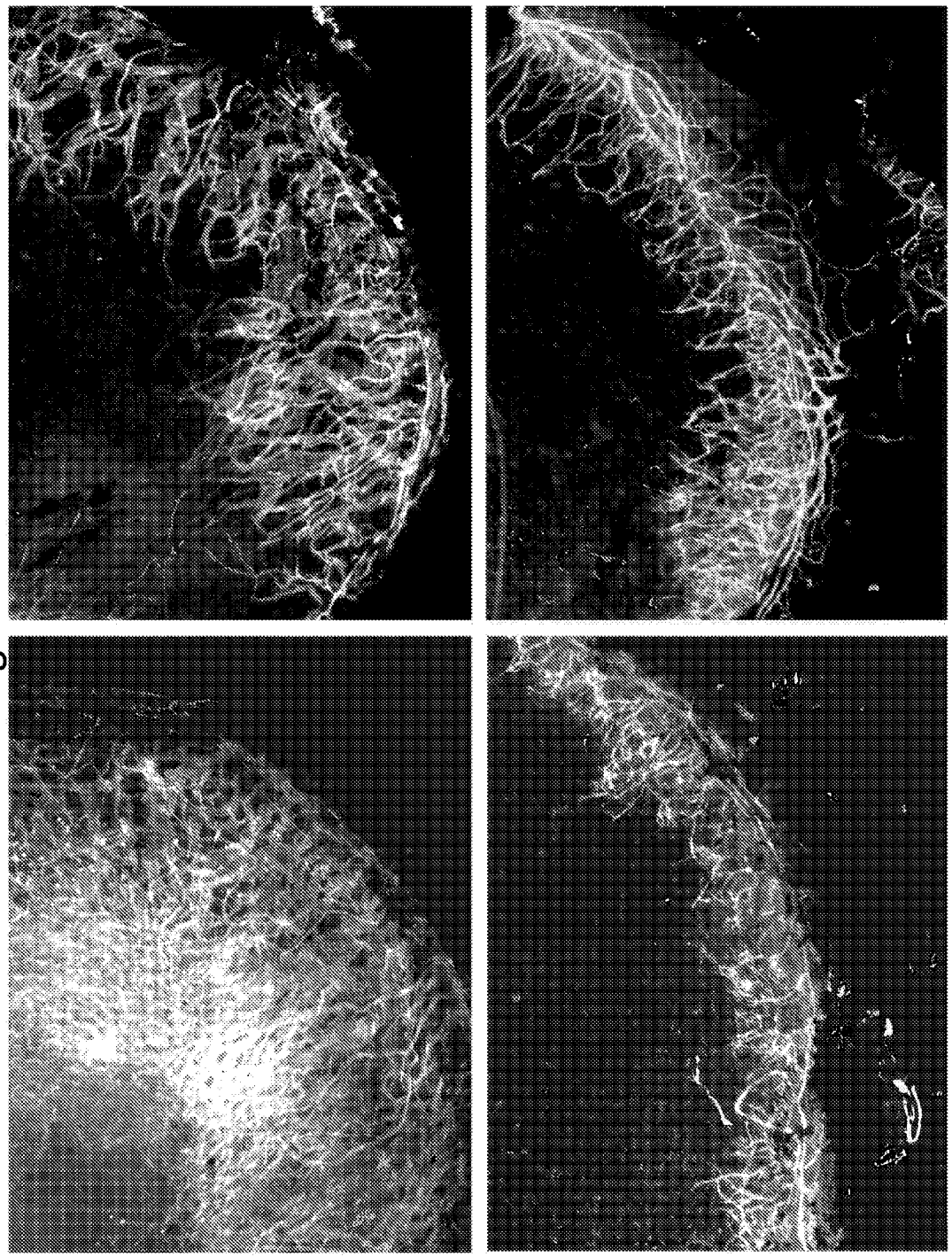

WITHANOLIDES, PROBES AND BINDING TARGETS AND METHODS OF USE THEREOF

CROSS-REFERENCE TO RELATED APPLICATIONS

This patent claims priority to U.S. provisional patent application Ser. No. 60/785,972, filed Mar. 27, 2006, herein incorporated by reference.

FIELD OF THE INVENTION

The present invention relates to compounds for targeting human or animal disease states characterized by aberrant expression of the intermediate filament type III proteins, such as vimentin, methods and compounds for detecting intermediate filament type III proteins, such as vimentin, and compounds for use in screening small molecules that target intermediate filament proteins.

BACKGROUND OF THE INVENTION

Natural products that demonstrate pharmacological efficacy are very important chemical scaffolds for drug design. While the vast majority of small molecule natural products will eventually be screened for biological activity, only a small fraction of these drug-like agents will move forward in the drug development pipeline. Currently, a considerable amount of effort is being directed through high throughput screening to select lead candidates based on their ability to bind to validated disease-associated protein targets.

A new approach has emerged that employs biologically active small molecules as cell permeable probes to identify novel binding targets and to study their function. Since pharmacological activity of a small molecule resides principally through binding interaction with its hypothetical biological target(s) (e.g., protein receptor), it is the discovery of such a protein receptor is of critical importance in drug development. Furthermore, the identification of the specific amino acid of the protein target to which the small molecule binds offers molecular insight into the specificity of such binding interactions. Consequently, the use of the binding site information allows one to look for similar binding sites in other classes of proteins, molecular information that helps expand the target cell types/organisms and clinical indications for the small molecule drug lead. The discovery of VIAGRA™ for male sexual dysfunction is one such example where research on phoshodiesterase inhibitors for cardiovascular dysfunction led to the serendipitous identification of a novel therapeutic area for this class of drugs.

In small molecule protein target discovery research, the most critical element is the innovative chemical design to convert a drug-like chemical compound into a useful biologically active chemical probe that affords the ability to use the reagent for identification of its in vivo protein binding target. Careful consideration is paid to not alter any of the small molecule's biological activities when the synthetic analog is generated. In addition, it is also important that a level of specificity for protein binding is demonstrated. Chemical radioisotope tagging is commonly used to generate a radiolabeled analog of the small molecule to help in protein target detection. However, a major drawback with this approach is that this method does not afford a direct means to isolate the binding target of this agent.

One recent screening method uses affinity tagging small molecules with biotin to form a small molecule analog, which seemingly provides the potential for isolating a small molecule binding target. Unfortunately, current techniques of biotin affinity tagging have not realized the full potential of isolating the binding target for small molecule agents due, in part, to the presence of the biotin attached to the small molecule, which may interfere with the natural binding of the small molecule analog with its target.

One small molecule is the natural product Withaferin A (hereinafter "WFA"), which is a potent angiogenesis inhibitor that targets the ubiquitin-proteasome pathway in vascular endothelial cells. WFA is an important prototype of the withanolide class of natural products and is a highly oxygenated steroidal lactone that is found in the medicinal plant *Withania somnifera* and its related solanaceas species. The withanolides are known to exert very potent and diverse cytotoxic, anti-stress, cardioactive, central nervous system, and immunomodulatory activities. Since the early discovery of WFA during the 1960s, the major interest has been on its anti-tumor cytotoxic activities. The mesenchymal type-III intermediate filament ("IF") protein vimentin plays a critical role in wound healing, angiogenesis and cancer growth.

The role of vimentin in human and animal disorders, including those disorders associated with aberrant or elevated expression of vimentin, and diseases associated with angiogenesis are known in the prior art, e.g. by the following references, U.S. Pat. Nos. 5,716,787; 5,932,545; 6,846,841; 7,132,245; 7,175,844; U.S. Patent application publication no. 2006/0014225; Hertig A, Verine J, Mougenot B, Jouanneau C, Ouali N, Sebe P, Glotz D, Ancel P Y, Rondeau E, Xu-Dubois Y C; Risk factors for early epithelial to mesenchymal transition in renal grafts, Am J Transplant; 2006 December; 6(12):2937-46 (hereinafter "Hertig et al."); Kenyon, B. M., et al., "Effects of Thalidomide and Related Metabolites in a Mouse Corneal Model of Neovascularization", Exp. Eye Res., 64:971-978 (1997) (hereinafter "Kenyon et al."); Cole, C. H., et al., "Thalidomide in the management of chronic graft-versus-host disease in children following bone marrow transplantation", Bone Marrow Transplantation, 14:937-942 (1994) (hereinafter "Cole et al."); Russell, M. E., et al., "Chronic Cardiac Rejection in the LEW to F344 Rat Model", J. Clin. Invest., 97(3):833-838 (1996) (hereinafter "Russell et al."; Kwon Y S, Kim J C. Inhibition of corneal neovascularization by rapamycin, Exp Mol Med. 2006 Apr. 30; 38(2):173-9 (hereinafter "Kwon et al."); Zogakis T G, Libutti S K, General aspects of anti-angiogenesis and cancer therapy, Expert Opin Biol Ther, 2001 March; 1(2):253-75, Review; Kirsch M, Santarius T, Black P M, Schackert G, Therapeutic anti-angiogenesis for malignant brain tumors. Onkologie, 2001 October; 24(5):423-30. Review hereinafter "Zogakis et al."); Manzano R, Peyman G, Khan P, Carvounis P, Kivilcim M, Ren M, Lake J, Chevez-Barrios P, Inhibition of experimental corneal neovascularization by Bevacizumab(AVASTIN), Br J Opthalmol. 2006 Dec. 19 (hereinafter "Manzano et al."); Yeh J R, Mohan R, Crews C M, The antiangiogenic agent TNP-470 requires p53 and p21 CIP/WAF for endothelial cell growth arrest, Proc Natl Acad Sci USA. 2000 Nov. 7; 97(23):12782-7 (hereinafter "Yeh et al."); Yu Y, Moulton K S, Khan M K, Vineberg S, Boye E, Davis V M, O'Donnell P E, Bischoff J, Milstone D S, E-selectin is required for the anti-angiogenic activity of endostatin, Proc Natl Acad Sci U S A. 2004 May 25; 101(21):8005-10 (hereinafter "Yu et al."); Murthy R C, McFarland T J, Yoken J, Chen S, Barone C, Burke D, Zhang Y, Appukuttan B, Stout J T, Corneal transduction to inhibit angiogenesis and graft failure, Invest Opthalmol V is Sci. 2003 May; 44(5):1837-42 (hereinafter Murthy et al."); Rogers M S, Rohan R M, Birsner A E, D'Amato R J. Genetic loci that control the angiogenic response to basic fibroblast growth factor. FASEB J. 2004 July; 18(10):1050-9 (hereinafter "Rogers et al."); Zhang M, Volpert O, Shi Y H, Bouck N. Maspin is an angiogenesis inhibitor, Nat. Med. 2000 February; 6(2):196-9 (hereinafter "Zhang et al."); and Mor-Vaknin N, Punturieri A, Sitwala K, Markovitz D M, Vimentin is secreted by activated macrophages, Nat Cell Biol. 2003 January; 5(1):59-63 (hereinafter "Mor-Vaknin et al."); all herein incorporated by reference.

Although the role of vimentin, and diseases associated with angiogenesis are known in the prior art, the non-cytotoxic anti-inflammatory and immunomodulatory mechanisms of WFA have thus far remained rather poorly characterized. These latter disease-altering activities are highly pertinent to the practice of ayurveda, a traditional form of Indian medicine, which has borne out many effective formulations from *W. somnifera*, especially for the treatment of chronic human diseases such as arthritis and female bleeding disorders.

SUMMARY OF THE INVENTION

The present invention relates to compounds for targeting functions of intermediate filament type III proteins, in particular, vimentin. The ability of certain withanolides to bind vimentin is positively correlated to the anti-angiogenic and anti-inflammatory activity of this compound class.

The present invention also relates to compounds and methods for detecting intermediate filament type III proteins, such as vimentin. For example, withanolide derivatives with chemical or radioactive tags can be used as detection probes and/or assist with the isolation of withanolide binding proteins and target-associated co-isolated proteins.

The present invention also relates to a method for screening small molecules as potential drug candidates that interfere with binding of WFA to its target protein binding site by use of a tagged withanolide analog, as demonstrated with biotinylated WFA. For example, a withanolide analog can be used to screen drugs that target intermediate filament proteins. In one form, the affinity tag biotin, which is covalently bonded to a hydrocarbon linker having a chain of $C_1$-$C_{20}$ (of structures shown) covalently bonded to the withanolide.

Affinity tagging with biotin allows for both the detection of the target protein of the small molecule and the target sites by isolation of the small molecule-bound protein target using affinity chromatography. The isolation of the target bound to the small molecule analog allows for the determination of the binding site. From knowing the target binding site, one can generate and develop tailored new classes of small molecule compounds, which may be even better drug candidates than the parental molecule.

Two key aspects, which allow for the isolation of the small molecule analog bound to its target, are that the placement of the biotin moiety should not hinder the small molecule's pharmacophores and that the small molecule biotin adduct must be separated by a chemical linker long enough that it allows the small molecule to enter into living cells and bind to its target in vivo.

A highly validated approach was used to test the effectiveness of the present screening method using small molecule analogs labeled with an affinity tag by designing a WFA-biotin affinity reagent as a test small molecule analog. The WFA-biotin affinity reagent utilized previous known structure-activity relationship studies to determine the pharmacophores of WFA. This information was used to generate a novel cell-permeable affinity analog of WFA that retains biological activity and identifies its covalent binding protein, as disclosed by Yokota et al., Development of Withaferin A., Bioorg Med Chem Lett. (2006), herein incorporated by reference.

A small molecule screening method comprises generating an affinity labeled withanolide analog by binding withanolide compound to an affinity tag via a linker group; introducing the affinity labeled withanolide analog to a cell culture that has been exposed to small molecule drug candidates; and contacting the affinity labeled withanolide analog with one of: (i) a purified protein that has been exposed to one or more small molecule drug candidates; (ii) a cell extract that has been exposed to one or more small molecule drug candidates; and (iii) a protein mixture that has been exposed to one or more small molecule drug candidates.

Using the present method, a small molecule can be selected as a potential drug based on its binding to the target. In addition, the present method can be used to determine a target binding site for the small molecule and/or the withanolide compound with the target.

In addition, a second small molecule can be generated based on its likely affinity for the determined target binding site, leading to other potential drug candidates.

The present invention, in another form thereof, relates to a method of producing a small molecule probe comprising a withanolide compound that has been conjugated to an affinity tag via a linker group. The affinity tag may be a biotin moiety and the linker group may be a $C_1$-$C_{20}$ long hydrocarbon chain linker.

The present invention, in another form thereof, relates to an affinity labeled screening compound analog comprising a withanolide covalently bonded to a linker molecule, which is itself covalently bonded to an affinity moiety tag.

Without being bound to any particular theory, the present invention in another form, concerns a method for treating diverse human or animal disorders characterized by aberrant or elevated levels of vimentin comprising administering an effective amount of WFA or a withanolide analog compound to an individual or animal in need of treatment therefrom to bind to vimentin, thereby treating the disease associated with elevated levels of vimentin. The disorders include but are not limited to angiofibroic diseases such as tumors, macular edema, proliferative diabetic retinopathy, macular degeneration, neovascular glaucoma, corneal neovascularization, and endometriosis and diseases with scar tissue formation such as scleroderma, keloids, kidney fibrosis, pulmonary fibrosis, cardiac fibrosis, chemotherapy/radiation induced lung fibrosis, pancreatitis, inflammatory bowel disease, Crohn's disease, hypertrophic scar, nodular fasciitis, eosinophilic fasciitis, Dupuytren's contracture, general fibrosis syndrome, characterized by replacement of normal muscle tissue by fibrous tissue in varying degrees, retroperitoneal fibrosis, liver fibrosis, and acute fibrosis, chronic inflammation such as Crohn's disease, ulcerative colitis, psoriasis, sarcoidosis, and rheumatoid arthritis, and organ transplant failure.

BRIEF DESCRIPTION OF THE FIGURES

FIG. 2a is a snapshot of a MD-simulated solvent accessible surface area binding structure showing WFA binding in the cleft between the A and A' α-helices of the vimentin tetramer, FIG. 2b is an enlargement of a portion of FIG. 2a, showing the A-ring twist-boat and B-ring half-chair conformation of WFA accommodated deep within the binding cleft of the vimentin tetramer, FIG. 2c is a ribbon model showing hydrogen bonding between Gln324 of the vimentin A-helix and the C1 position oxygen atom, and Asp331 of the vimentin A'-helix and the C4 hydroxyl group, and FIG. 2d depicts the alpha orientations of the C5 (OH) and C6-C7 (epoxide) of the inactive withanolide congener 12-D WS appose Cys328 of vimentin;

FIG. 5a comprises four panels of various micrographs in which wild-type mice and vimentin-deficient mice were subjected to corneal chemical injury, and FIG. 5b are plots quantifying neovascularization from each group of mice from FIG. 5a.

DETAILED DESCRIPTION

Figure 1A:
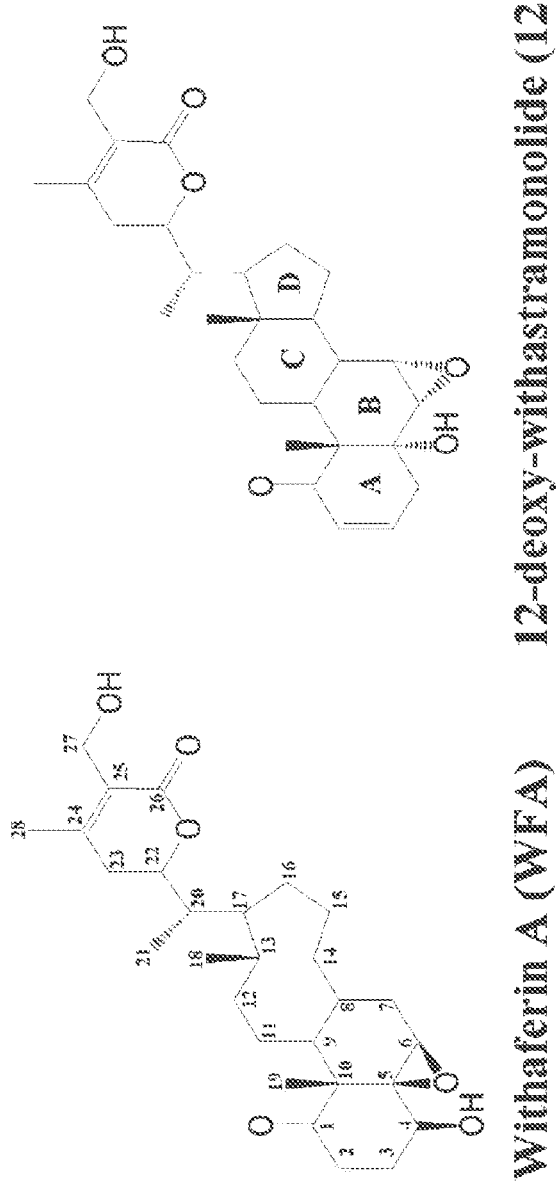
FIG. 1*a* shows the chemical structures of WFA and 12-D WS.
Figure 1:
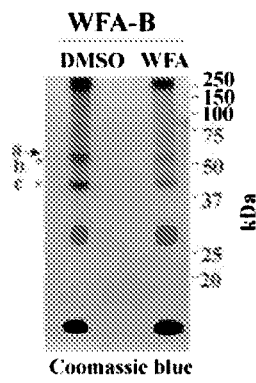
FIG. 1*b* is a Coomassie blue stained gel depicting affinity isolation of WFA-B binding proteins.
FIG. 1*c* is a protein blot depicting WFA-B binding to a 56 kDa protein in HUVECs.
FIG. 1*d* is a protein blot depicting WFA-B binding to vimentin in HUVECs.
FIG. 1e is a protein blot depicting tetrameric soluble hamster vimentin incubated with different doses of WFA or inactive congener 12-D WS.
Figure 1:
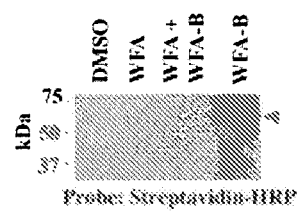
Figure 1:
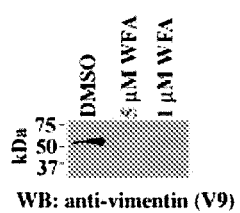
Figure 1:
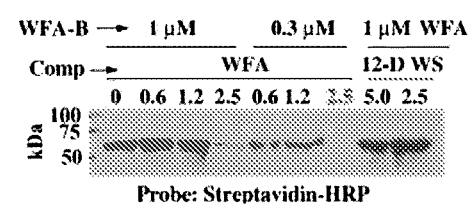

A novel withanolide chemical genetic probe is used to identify, in vivo, the binding target of withaferin A, which is the intermediate filament type III protein vimentin. For example, a withanolide-based small molecule is used in a screening method to screen drug candidates that target intermediate filament type III proteins. The method includes introducing a tagged linker covalently bonded to the withanolide molecule to form a withanolide analog. The linker may be a $C_1$-$C_{20}$ long hydrocarbon chain linker and the affinity tag can be a biotin moiety.

As a result, the linker spaces the affinity group sufficiently from the small molecule moiety so as to prevent the affinity tag from interfering with the normal binding of the small molecule with its target. Accordingly, the present invention allows for a more accurate identification of a small molecule's binding site on a target and identification of the target binding sites without the affinity group interfering with the binding of the small molecule with the target.

The affinity tag and linker are selected so as to not interfere with the uptake of the small molecule analog by a target cell. The exact composition or form of the linker group is not particularly relevant so long as the linker group sufficiently spaces the affinity group from the small molecule and the linker group does not adversely effect the binding of the small molecule with its target. The affinity tag can be biotin or any other appropriate affinity tag which can be covalently bound to the linker.

Better or alternative potential small molecule compounds as potential drug candidates can be generated based on their likely affinity for the determined binding site.

The affinity labeled withanolide can also be used to find intermediate filament-associated proteins via chemical proteomics by extracting proteins from cells that were exposed to withanolide-biotin analog. The withanolide probes can be used to monitor expression of vimentin, in tumor samples or other diseased tissues. The Withaferin analogs can be used as a treatment for vimentin associated cancers, such as epithelial-to-mesenchymal transition found in epithelial cancers, such as breast cancer, using Withaferin A and other analogues which also target vimentin. The Withaferin analogs also can be used as a treatment for other vimentin associated disorders, including but not limited to a broad range of angiobibrotic diseases with scar tissue formation, chronic inflammation, and organ transplant failure.

Examples of preferred withanolide analogs include the following structures:

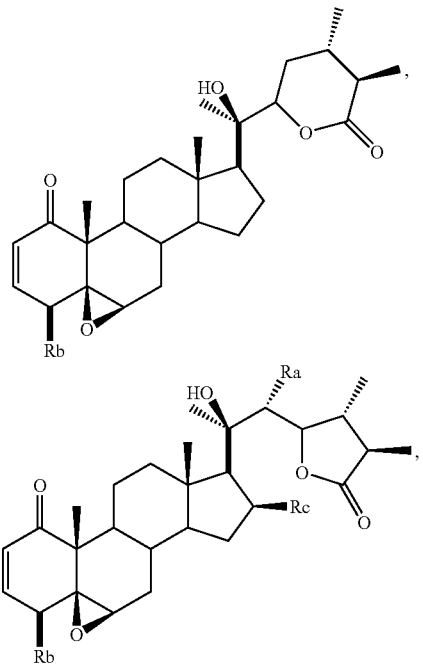

-continued

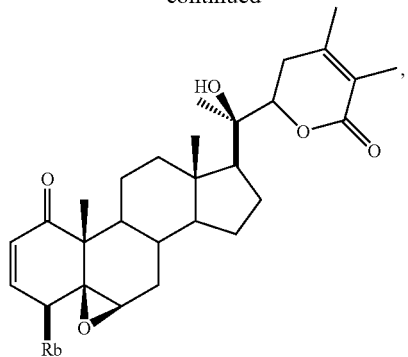

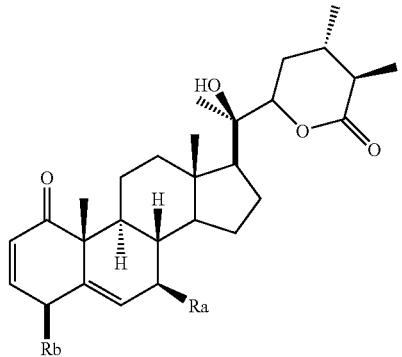

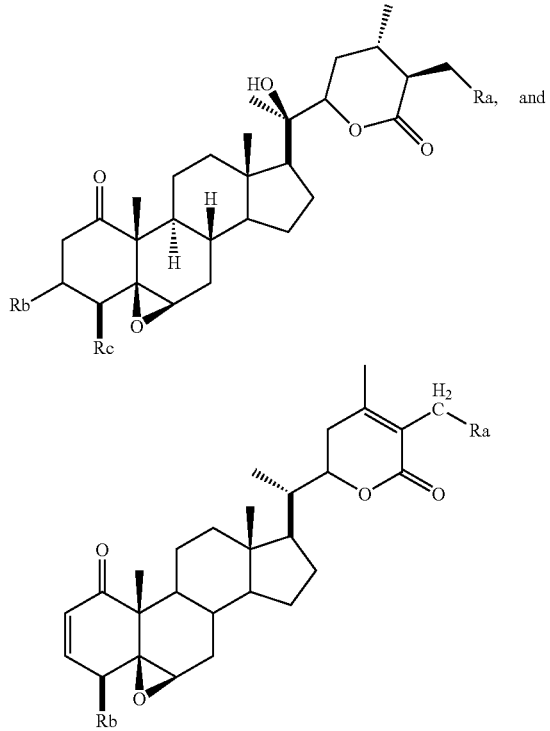

where:
(a) Ra, Rb & Rc are —OH; or
(b) Ra, Rb and Rc are independently —O-Rd-Re,
  Rd is a straight or branched alkyl with up to 12 carbons or aralkyl,
  Re is —OH, —NH$_2$, —Cl, Br, —I, —F, CF$_3$, or biotin, digoxigenin, BODIFY (8-chloromethyl-4,4-difluoro-1,3,5,7-tetramethyl-4-bora-3a,4a-diaza-s-indacene) succinate, or radioactive ligand; or (c) Ra, Rb & Rc are independently —O—C(=O)-Rd-Re,
  Rd is a straight or branched alkyl with up to 12 carbons or aralkyl,
    (i) Re is —OH, —NH$_2$, —Cl, Br, —I, —F, CF$_3$ or biotin, digoxigenin, BODIFY (8-chloromethyl-4,4-difluoro-1,3,5,7-tetramethyl-4-bora-3a,4a-diaza-s-indacene) succinate, or radioactive ligand —O—C(=O)—R-Rd, where R is mono- di- tri-ethyleneglycol; or
    (ii) Re is OH, —NH$_2$, —Cl, Br, —I, —F, CF$_3$ or biotin, digoxigenin, BODIFY (8-chloromethyl-4,4-difluoro-1,3,5,7-tetramethyl-4-bora-3a,4a-diaza-s-indacene) succinate, or radioactive ligand; or
(d) Ra, Rb & Rc are independently —O—C(=O)—X—NH—Re where X is a straight or branched alkyl with up to 12 carbons or mono- di- tri-ethyleneglycol,
  Re is —OH, —NH$_2$, —Cl, Br, —I, —F, CF$_3$ or biotin, digoxigenin, BODIFY (8-chloromethyl-4,4-difluoro-1,3,5,7-tetramethyl-4-bora-3a,4a-diaza-s-indacene) succinate, or radioactive ligand or Rd is —(C=O)—Re,
  Re is Cy5.5 acetate, Fluorescein acetate, 2-Naphthoxy acetate, Benzoyl, Benzoyl benzyl acetate, phloro-acetophenone acetate, 4-methoxy-2-hydroxy-benzoate, Alexa succinate, Coumarin acetate, 1-naphthyl, 1-, or 1,3- or, 1,3,5-methoxy-benzyl, 1 to 5 fluoro-benzyl or piperazynyl; or
(e) Ra, Rb & Rc are independently —O—C(=O)—X—Y—Z, where X is a straight or branched alkyl with up to 12 carbons or mono- di- tri-ethyleneglycol
    (i) Y is penta, hexa, hepta and octapeptides comprising any combination of amino acids selected from the group consisting of Leu, Ala, Pro Tyr, Ile, hydroxy proline, and Cys; and Z is (argine)8, Z=—OH, —O-benzyl, —NH$_2$; or
    (ii) Y is (argine)8, and Z=penta, hexa, hepta and octapeptides comprising any combination of amino acids selected from the group consisting of Leu, Ala, Pro Tyr, Ile, hydroxy proline, and Cys.

The preferred dose for administration of a withanolide compound composition in accordance with the present invention is that amount which will be effective in preventing or treating a vimentin associated disease such as, but not limited to cancers, a broad range of angiofibrotic diseases with scar tissue formation, chronic inflammation, and organ transplant failure, would readily recognize that this amount will vary greatly depending on the nature of the disorder and the condition of a patient. An "effective amount" of the withanolide compound or pharmaceutical agent to be used in accordance with the invention is intended to mean a nontoxic but sufficient amount of the agent, such that the desired prophylactic or therapeutic effect is produced. Thus, the exact amount of the withanolide compound or a particular agent that is required will vary from subject to subject, depending on the species, age, and general condition of the subject, the severity of the condition being treated, the particular carrier or adjuvant being used and its mode of administration, and the like. Similarly, the dosing regimen should also be adjusted to suit the individual to whom the composition is administered and will once again vary with age, weight, metabolism, etc. of the individual. Accordingly, the "effective amount" of any particular withanolide compound or composition will vary based on the particular circumstances, and an appropriate effective amount may be determined in each case of application by one of ordinary skill in the art using only routine experimentation.

It will be clear to one of ordinary skill in the art, which vimentin associated conditions or diseases will benefit from the present treatment, based on the role of vimentin in such conditions or diseases and the effect the binding of a withanolide compound or a particular agent to the vimentin has on the role of vimentin. For example, it will be known to one of ordinary skill in the art, which angiogenesis diseases, including cancers, which will benefit from the present treatment with a withanolide compound or a particular agent in accordance with the present treatment method.

The present small molecule screening method in which small molecule analogs comprising small molecules covalently bonded to an affinity tag via a linker was established using various experiments with WFA binding proteins. These experiments confirm that affinity tagged small molecules can be used to determine the specific binding sites on target molecules, such as proteins. From knowing the target binding sites, new or additional small molecules can be developed as potential drug candidates, which have affinity for the target binding site. Thus, the present experiments demonstrate the effectiveness of a screening method which can be used to determine new potential drug candidates which bind to those target binding sites.

For example, as shown by Eckes, B. et al., Impaired wound healing in embryonic and adult mice lacking vimentin, *J. Cell Sci.* 113, 2455-2462 (2000); and van Beijnum, J. R. et al., Gene expression of tumor angiogenesis dissected: specific targeting of colon cancer angiogenic vasculature, *Blood* 108, 2339-2348 (2006), both herein incorporated by reference, the small molecule angiogenesis inhibitor WFA binds to tetrameric vimentin by covalently modifying the cysteine residue in its conserved α-helical coiled coil 2B domain. Building on what is know in the art with regard to the role of vimentin with regard to disease conditions such as fibrosis and inflammation as discussed in the above background section, WFA binding to tetrameric vimentin induces filamentous aggregation in vitro, which manifests in vivo as punctuate cytoplasmic aggregates that co-localize with vimentin and actin. WFA's potent dominant-negative effect on F-actin requires vimentin expression and induces apoptosis. Finally, WFA inhibits capillary growth in a mouse model of corneal neovascularization, but this drug-induced inhibition is compromised in vimentin deficient mice. Thus, WFA is useful for incorporation as a novel chemical genetic probe of vimentin functions, and illuminates a potential new molecular target for withanolide-based therapeutics for treating angioproliferative and malignant diseases, and as a model for IF protein-related human dystrophies.

The prototypic withanolide WFA (FIG. 1a), which is abundant in the Indian medicinal plant *Withania somnifera*, is a potent inhibitor of angiogenesis and tumor growth. To understand the mode of action of this natural product, a chemical genetic approach was exploited that affords isolation of small molecule binding target(s) in accordance with Crews, C. M. & Splittgerber, U. Chemical genetics: exploring and controlling cellular processes with chemical probes, *Trends Biochem. Sci.* 24, 317-320 (1999); Schreiber, S. L., Chemical genetics resulting from a passion for synthetic organic chemistry, *Bioorg. Med. Chem.* 6, 1127-1152 (1998), both herein incorporated by reference. Towards this end, a novel WFA-biotin analog, WFA-B, was synthesized, as shown below.

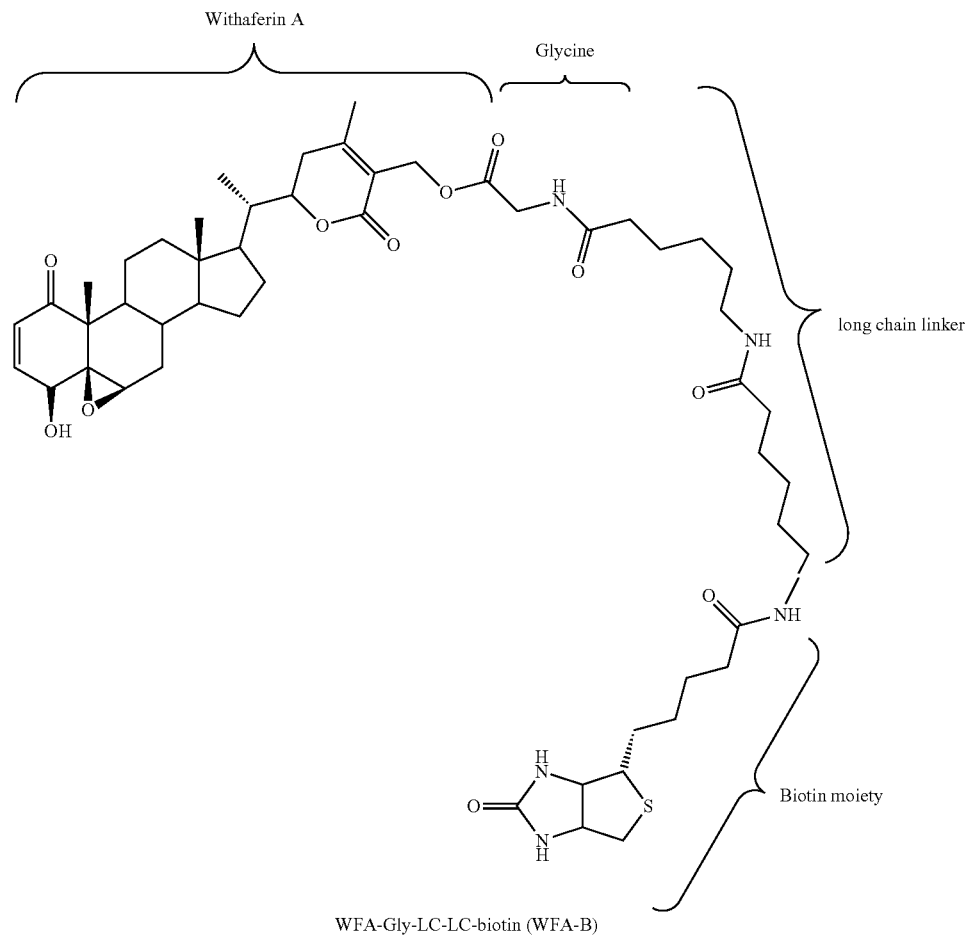

WFA-Gly-LC-LC-biotin (WFA-B)

To generate the WFA-biotinylated analog, the $C_{2-7}$ hydroxyl group of WFA was first derivatized with glycine, which introduced a free amine functional group for subsequent biotin coupling. The amine group was coupled with a biotinylated 12-hydrocarbon chain linker to produce WFA-Gly-LC-LC-biotin (hereinafter "WFA-B"), as taught by Yokota, Y., Bargagna-Mohan, P., Ravindranath, P. P., Kim, K. B. & Mohan, R., Development of Withaferin A analogs as probes of angiogenesis, *Bioorg. Med. Chem. Lett.* 16, 2603-2607 (2006), herein incorporated by reference.

WFA-B binds to a 56 kDa protein that is irreversibly targeted by WFA in vivo in human umbilical vein endothelial cells (HUVECs). To isolate this WFA-target, bovine aortic endothelial cells (BAECs) were treated with WFA-B, and biotinylated proteins were affinity-purified over NEUTRAVIDIN™ columns and fractionated by gel electrophoresis. Gels stained with Coomassie blue dye confirmed the isolation of this 56 kDa protein (FIG. 1b).

Affinity isolation of WFA-B-binding proteins was conducted as follows. BAECs were preincubated with DMSO (Veh) or with 5 μM WFA for 30 minutes and subsequently with 5 μM WFA-B for 2 hours. Cell lysates prepared in 1% Triton X-100 buffer were purified over NEUTRAVIDIN™ affinity columns and subjected to SDS-PAGE. The gel was stained with Coomassie blue. The arrow points to the 56 kDa protein band and asterisks mark the co-eluted 51 kDa and 43 kDa proteins.

LC-MS/MS characterization of this protein identified the 56 kDa protein as vimentin (27% protein coverage), an IF protein that is abundant in mesenchymal cells. To further support that vimentin is bound by WFA-B in vivo, HUVECs were treated with WFA-B in the presence and absence of unconjugated WFA, and total cellular lysates were gel-fractionated and protein blots probed with streptavidin-HRP. Referring to FIG. 1c, the blot confirms that WFA-B binds to the 56 kDa protein in HUVECs. This experiment was conducted using cells preincubated with DMSO or WFA for 30 minutes and subsequently with WFA-B for 2 hours. Soluble proteins extracted in 1% Triton X-100 were fractionated by SDS-PAGE and blotted. This blot, as well as those of FIGS. 1d and 1e, were developed with Streptavidin-HRP. Biotin label is incorporated in this 56 kDa protein in a WFA-competitive manner.

As shown in the blot of FIG. 1d, WFA-B binds vimentin in HUVECs. The blot of FIG. 1d was produced using cell cultures preincubated with DMSO (Veh) or with 5 μM WFA or 1 μM (WFA*) for 30 minutes and subsequently with 5 μM WFA-B for 2 hours. Cell lysates prepared in 1% Triton X-100 buffer were purified over NEUTRAVIDIN™ affinity columns and subjected to SDS-PAGE and western blotted with antivimentin V9 antibody.

Referring now to FIG. 1e, in vitro ligand binding assays were performed which show that vimentin is bound by WFA-B in a WFA-competitive manner. The assays were performed using soluble hamster vimentin incubated with different doses of WFA or inactive congener 12-DWS for 1 hour and subsequently with either 0.3 or 1 μM WFA-B for 1 hour. The proteins were fractionated by SDS-PAGE, blotted and biotinylated adduct was detected by streptaviding-HRP with chemiluminescence.

The WFA-B-affinity chromatographic approach (FIG. 1b) also led to co-isolation of 51 kDa β-tubulin and 43 kDa β-actin. Since vimentin has been reported to interact with actin and it is a cargo for microtubule-dependent transport, it is not unexpected that actin and tubulin would co-isolate with WFA-B-modified vimentin.

Next, to identify the amino acid residue(s) of vimentin covalently modified by WFA, purified hamster vimentin was incubated with WFA and the protein-ligand complexes subjected to tryptic digestion and LC-MS/MS analysis. A search for the position of adduct formation (a molecular mass shift of 470) in the tryptic fragments of vimentin revealed that the sole cysteine residue at position 327 (position 328 in human vimentin) in the α-helical coil coiled 2B rod domain of vimentin is uniquely modified by WFA (data now shown). A three-dimensional model of the WFA-vimentin complex was developed using x-ray crystal structures of vimentin and WFA. Molecular modeling studies revealed a stable binding mode for WFA in the surface binding pocket of tetrameric vimentin between the pair of head-to-tail α-helical dimers (FIG. 2a). In this simulated model, the C3 and C6 carbons of WFA lie in close proximity to the cysteine residue in the vimentin A-helix (FIG. 2b), permitting a nucleophilic attack by this thiol group on the electrophilic carbon centers (FIG. 2c). Remarkably, the amino acid residues of vimentin (Gln324, Cys328 and Asp 331) that make contact with WFA (FIG. 2c) are identical from fish to mammals, as shown in the table below.

| Species | Sequence | Sequence Listing Identifier |
|---|---|---|
| Human: | RQAKQESTEYRRQVQALTCEVDSLKGTNESLERQMREMEEN | SEQ ID NO: 1 |
| Chimpanzee: | RQAKQESTEYRRQVQAPTCEVDSLKGTNESLERQMREMEEN | SEQ ID NO: 2 |
| Macaque: | RQAKQESNEYRRQVQALTCEVDSLKGTNESLERQMREMEEN | SEQ ID NO: 3 |
| A.Green monkey: | RQAKQESNEYRRQVQALTCEVDSLKGTNESLERQMREMEEN | SEQ ID NO: 4 |
| Rhesus monkey: | RQAKQESNEYRRQVQALTCEVDSLKGTNESLERQMREMEEN | SEQ ID NO: 5 |
| Pig: | RQAKQESNEYRRQVQALTCEVDSLKGTNESLERQMREMEEN | SEQ ID NO: 6 |
| Dog: | RQAKQESNEYRRQVQALTCEVDSLKGTNESLEHQMREMEEN | SEQ ID NO: 7 |
| Bovine: | RQAKQESNEYRRQVQALTCEVDSLKGTNESLERQMREMEEN | SEQ ID NO: 8 |
| Hamster: | RQAKQESNEYRRQVQALTCEVDSLKGTNESLERQMREMEEN | SEQ ID NO: 9 |
| Mouse: | RQAKQESNEYRRQVQALTCEVDSLKGTNESLERQMREMEEN | SEQ ID NO: 10 |
| Rat: | RQAKQESNEYRRQVQALTCEVDSLKGTNESLERQMREMEEN | SEQ ID NO: 11 |

-continued

| Species | Sequence | Sequence Listing Identifier |
|---|---|---|
| Chicken: | RQAKQEANEYRRQIQALTCEVDSLKGSNESLERQMREMEEN | SEQ ID NO: 12 |
| Frog: | RQAKQETSDFRRQIQALTCEVDSLKGSNESYERQMREMEEN | SEQ ID NO: 13 |
| Fish (Trout): | RQAKQEANEYRRQVQALTCEVDSLKGTNESMERQMRELEES | SEQ ID NO: 14 |

As shown from the table, the binding site of WFA in vimentin is evolutionarily conserved. Amino acid sequences from within the 2B domain of vimentins of different vertebrate species reveal the overall high level of sequence conservation. The specific amino acids that make contact with WFA (bold), as determined from our molecular modeling studies, are evolutionarily identical.

Another feature illustrated by this model is that the orientation of C27 hydroxyl group places it outside the binding cleft; thus, biotinylated WFA is able to retain the flexibility to bind immobilized NEUTRAVIDIN™ after modifying tetrameric vimentin. On the other hand, the simulated model of vimentin/the inactive congener 12-D WS (FIG. 2d) reveals that steric hindrances from the C5 alpha-hydroxyl and the C6-C7 epoxide of WFA are likely to prevent such a nucleophilic attack by the reactive thiol group on 12-D WS. This distinction between these two withanolides in their binding modes with vimentin is further corroborated by comparing the molecular docking-simulated internuclear distances between WFA and 12-D WS with vimentin, and this data is consistent with lack of in vitro binding activity of 12-D WS to vimentin (FIG. 1d) and the absence of its endothelial cell targeting activity.

The clinical importance of the cysteine residue in vimentin lies in its propensity for being preferentially oxidized in vimentin compared to other cytoskeletal proteins from rheumatoid arthritis patients. Because this unique cysteine residue under oxidizing conditions can participate in disulfide cross-linking between a pair of vimentin dimers leading to disruption to the filament structure in vitro, how chemical modification of cysteine by WFA affects the vimentin IF structure was investigated. Employing soluble tetrameric vimentin in filament polymerization assays in vitro, although WFA at high doses does not block filament assembly per se, the drug induces formation of filamentous aggregates, many of which display amorphous condensed structures as revealed in negatively stained transmission electron micrographs (FIGS. 3a-3j).

Figure 3:
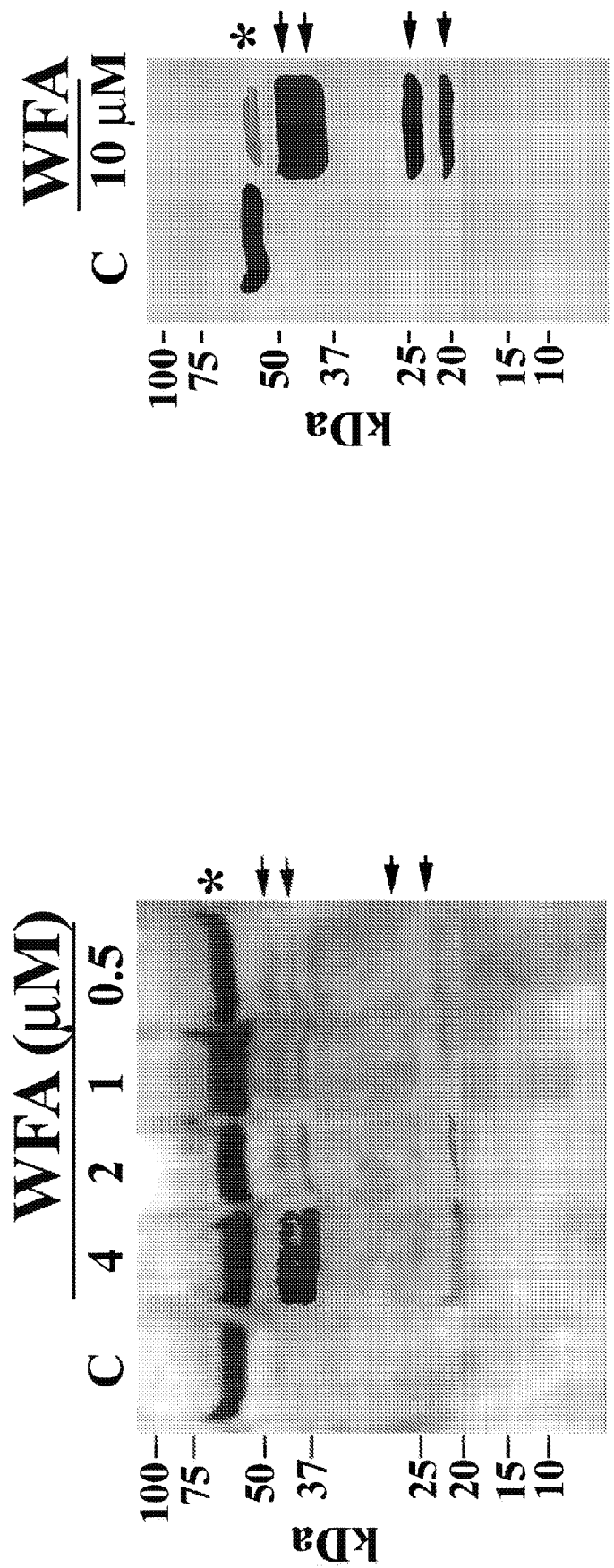
FIG. 3a depicts tetrameric soluble hamster vimentin polymerized in the presence of 170 mM NaCl.
FIG. 3b depicts polymerization of tetrameric vimentin in the presence of 25 µM WFA.
FIG. 3c depicts irregular fragmented aggregated structures.
FIG. 3d shows that 12-D WS does not disrupt vimentin polymerization.
FIGS. 3e-3j are micrographs in which the BAECs are treated with DMSO (FIGS. 3e, 3f and 3g) or 3 µM WFA (FIGS. 3h, 3i and 3j) for 18 hours, stained for vimentin using a monoclonal anti-vimentin antibody, and co-stained with phalloidin-rhodamine.
FIG. 3k is a western blot analysis of HUVECs showing dose-responsive increases in vimentin cleavage products produced by WFA treatment.
FIG. 3l is a western blot depicting higher concentrations and longer periods of exposure to WFA cause reduction in levels of the 56 kDa protein.

FIG. 3a depicts tetrameric soluble hamster vimentin polymerized in the presence of 170 mM NaCl by incubation at 37° C. for 1 hour. The protein was fixed with 0.5% glutaraldehyde, stained with uranyl acetate and observed by transmission electron microscopy. The presence of vehicle solvent does not interfere with filament formation.

FIG. 3b depicts polymerization of tetrameric vimentin in the presence of 25 μM WFA, which produces extensive filamentous aggregates, and FIG. 3c depicts many irregular fragmented aggregated structures. As shown in FIG. 3d, 12-D WS (25 μM) does not disrupt vimentin polymerization.

BAECs treated with DMSO (FIGS. 3e, 3g, 3i) or 3 μM WFA (FIGS. 3f, 3h, 3j) for 18 hours were stained for vimentin using a monoclonal anti-vimentin antibody (green) and co-stained with phalloidin-rhodamine (red). The vimentin (FIGS. 3e, 3f) and phalloidin-stained images (FIGS. 3g, 3h), in fluorescence overlap, reveal the presence of numerous cytoplasmic particulate granules that co-stain for vimentin and disrupted F-actin in WFA-treated cells compared to controls (FIGS. 3i, 3j). FIG. 3k is a western blot analysis of HUVECs which shows dose-responsive increases in vimentin cleavage products (arrows) with WFA treatment after 2 hours, as detected with the monoclonal anti-vimentin V9 antibody. FIG. 3l depicts higher concentrations and longer periods of exposure to WFA (4 hours) cause reduction in levels of the 56 kDa protein (asterisk) and increased abundance of cleavage products of vimentin (arrows).

The amorphous condensed structure phenotype is not observed with lower doses of WFA or equivalent high dose of the inactive congener 12-D WS. To further corroborate that vimentin aggregation by WFA treatment is associated with perturbation of the cytoskeleton structure, the drug effects in BAECs were investigated by immunostaining. Cells treated with 3 μM WFA showed condensation of vimentin filaments around the perinuclear region and the presence of numerous, vimentin-positive staining particles in the cytoplasm (compare FIG. 3e with FIG. 3f). Importantly, these vimentin particulates strongly co-stain for actin (compare FIG. 3h with FIG. 3j), exemplifying the role of the WFA-binding domain in control of cytoskeletal structure through the actin-binding activity of vimentin 2B domain.

As it became apparent that vimentin targeting by WFA may initiate signaling events leading to cellular apoptosis, the effect of WFA on soluble tetrameric vimentin was investigated. Using western blot analysis of soluble proteins from HUVECs treated with WFA, dose-dependent (above 2 μM) increases in vimentin cleavage products became detectable by 2 hours after drug treatment (FIGS. 3k and 3l). Additionally, two-dimensional-western blot analysis reveals that WFA-B also causes several full-length (~53-56 kDa) isoforms of vimentin to disappear in a manner similar to WFA-induced effects in HUVECs (data not shown), data that further supports the in vivo drug-mimetic effect of this WFA analog.

Figure 4:
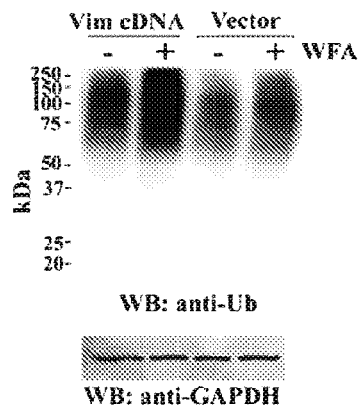
FIG. 4a comprises an upper panel blot depicting MCF-7 cells which lack endogenous IF proteins which were transfected with human vimentin cDNA or vector control and after 24 hour cells treated with either vehicle or 2 µM WFA.
FIG. 4b is a plot showing 20S proteasome preparation incubated with vehicle, Epoxomicin or WFA in the presence of LLVY-AMC substrate.
FIG. 4c is a graph of embryonic fibroblast cell lines derived from vimentin-deficient mice and wild-type littermates treated with vehicle or 5 µM WFA.
FIG. 4d is a micrograph showing BAECs transduced with WFA-modified vimentin and cells stained for vimentin.
FIG. 4e is a micrograph depicting BAECs transduced with WFA-modified vimentin and stained for actin.
FIG. 4f is a micrograph depicting BAECs transduced with vehicle-treated vimentin having well distributed orchestration of vimentin filaments.
FIG. 4g depicts BAECs transduced with vehicle-treated vimentin having well distributed orchestration of actin cytoskeleton.
Figure 4:
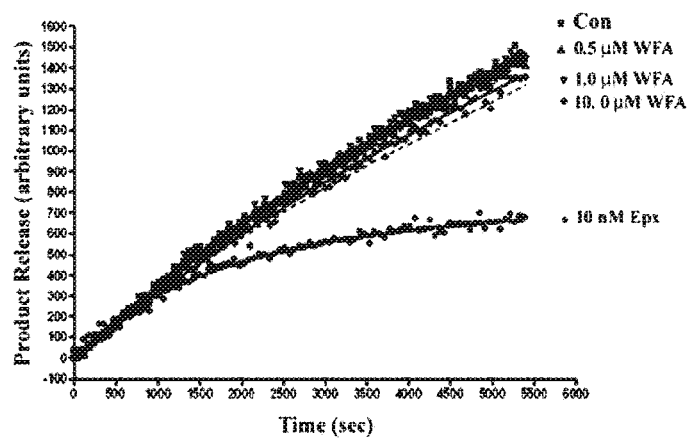
Figure 4:
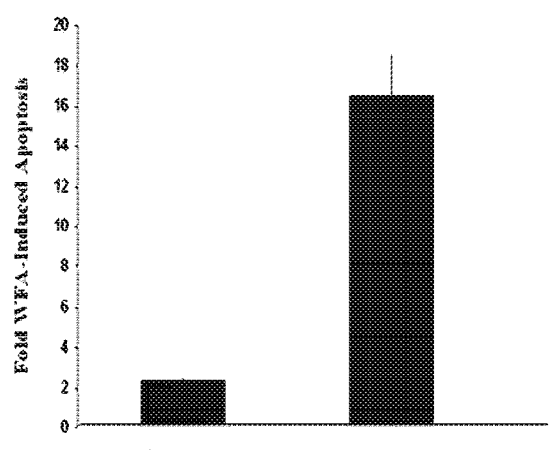

Since IF protein aggregation has been shown to negatively impact the ubiquitin proteasome pathway (UPP) resulting in proteasome inhibition, an investigation as to whether the UPP-targeting activity of WFA is also regulated in a vimentin-dependent manner was undertaken. Employing the widely used MCF-7 vimentin-deficient model of Bar, H. et al., Forced expression of desmin and desmin mutants in cultured cells: impact of myopathic missense mutations in the central coiled-coil domain on network formation, *Exp. Cell. Res.* 312, 1554-1565 (2006), herein incorporated by reference, it was determined that co-treatment with WFA increases levels of polyubiquitinated proteins in vimentin transfected MCF-7 cells, but not in the vector controls (FIG. 4a). MCF-7 cells that lack endogenous IF proteins were transfected with human vimentin cDNA or a vector control and after 24 hours cells were treated with either vehicle or 2 μM WFA for 1 hour. Cell lysates were prepared and equal amounts of protein subjected to SDS-PAGE and protein blots probed with anti-ubiquitin antibody. Blots were re-probed with anti-GAPDH antibody.

Referring to FIG. 4b, 20S proteasome (bovine) preparation was incubated with vehicle (Con), 0.5 µM, 1.0 µM and 10 µM WFA or with 10 nM Epoxomicin (Epx) in the presence of LLVY-AMC substrate at room temperature. Fluorescence readings from triplicate samples were obtained at different time intervals from the 96-well plate using excitation at 355 nm and emission at 430 nm. The release of product was plotted against time for each concentration of inhibitor.

Referring to FIG. 4c, embryonic fibroblast cell lines derived from vimentin-deficient mice and wild-type littermates were treated with vehicle or 5 µM WFA for 24 hours. Cells were harvested and stained with annexin V-FITC and propidium iodide and extent of apoptosis assessed by flow cytometry. The fold-apoptotis for drug over vehicle-treated samples for each cell line was plotted (n=2 experiments).

Referring to FIG. 4d, BAECs were transduced with WFA-treated vimentin and cells were stained after 18 hours. Cells transduced with WFA-modified vimentin show condensed vimentin filaments localized largely in and around the nucleus and the presence of vimentin-staining particulates (FIG. 4e). Cells transduced with vehicle-treated vimentin show well distributed orchestration of vimentin IFs (FIG. 4f) and actin cytoskeleton (FIG. 4g). Results representative of n=3 experiments are shown.

Referring back to FIG. 4a, to corroborate that vimentin-targeting and not the possible direct inhibition of the 20S proteasome by WFA mediates its UPP-targeting function, tests were conducted on WFA in proteasome kinetic assays. Whereas epoxomicin, a highly selective proteasome inhibitor, significantly inhibits the 20S proteasome's major catalytic function at 10 nM, WFA, even at cytotoxic concentrations of 10 µM, minimally inhibits this catalytic activity (FIG. 4b). The Kobs/[I] ($M^{-1}S^{-1}$), a measure of the efficiency of inactivation, was calculated to be 340±80 (0.5-10 µM) for WFA, while that of epoxomicin is 44,510±7,000 (10-75 nM). Contrary to a recent report of Yang, H., Shi, G. & Dou, Q. P., The tumor proteasome is a primary target for the natural anticancer compound Withaferin A isolated from "Indian Winter Cherry," *Mol. Pharmacol.* November 8 online (2006), herein incorporated by reference, the presently acquired data provides evidence that WFA-modified vimentin may mediate sequestration of ubiquitinated proteins and result in proteasome inhibition in vivo. Thus, employing cell lines derived from vimentin-deficient and isogenic wild-type mouse strains confers enhanced resistance to drug-induced apoptosis with wild-type cells having a 7-fold greater rate of apoptosis (FIG. 4c). Furthermore, exploiting a protein transduction methodology to introduce the WFA-modified, dominant-negative, vimentin tetramers into cells, immunostaining demonstrates that endogenous vimentin IFs and F-actin are found to aggregate, whereas cells transduced with vehicle-treated vimentin do not produce this phenotype (compare FIG. 4d with FIG. 4f). Collectively, these findings demonstrate that vimentin-targeting by WFA can affect the severe alterations in the cytoskeleton architecture (FIGS. 4e and 4g).

Figure 5:
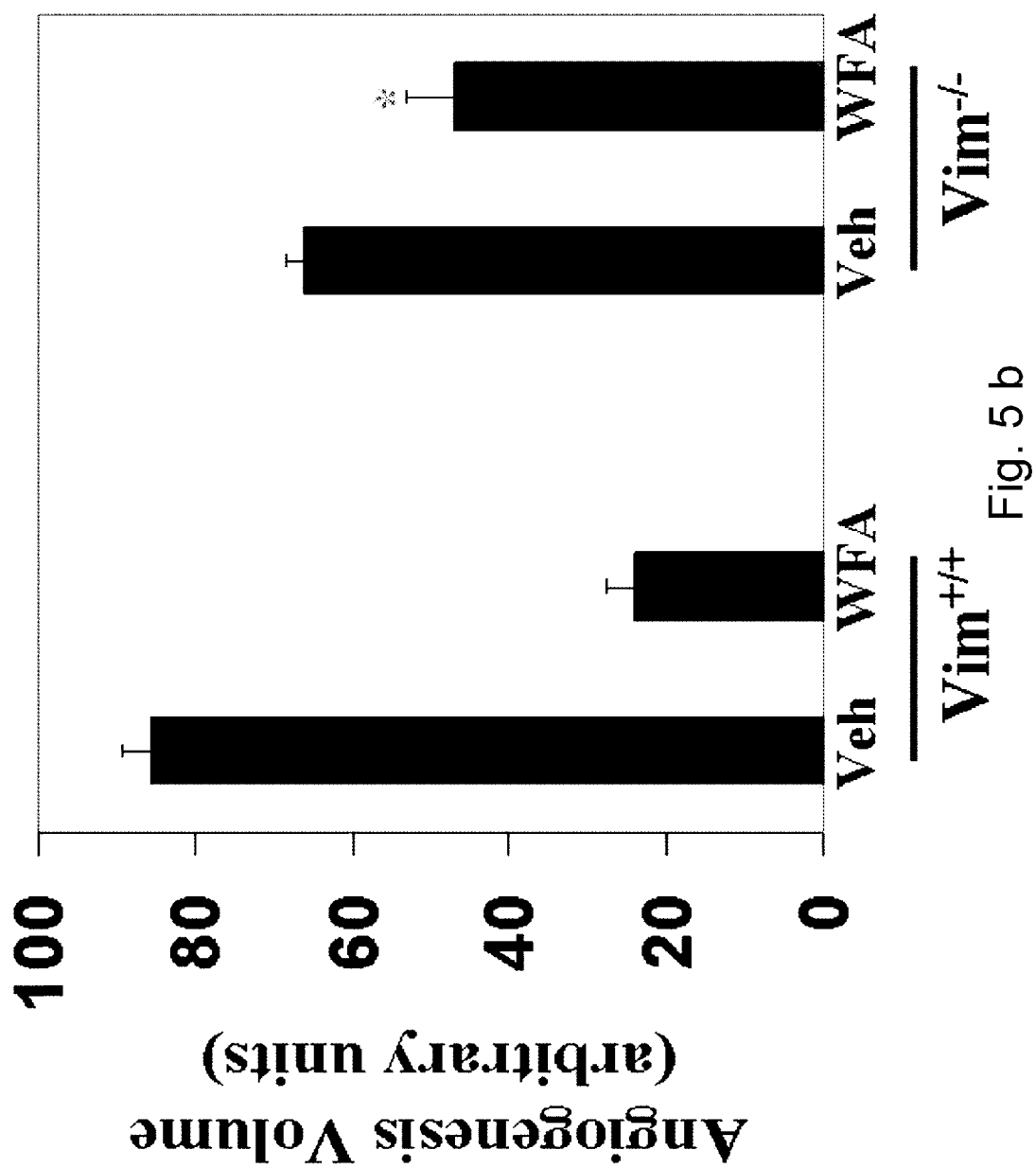

Since WFA exerts potent angiogenesis inhibitory activity in vivo, drug activity on de novo capillary growth in vimentin deficiency was investigated. The mouse model of injury-induced corneal neovascularization shows that WFA markedly suppresses neovascularization in wild-type mice (73% inhibition, n=8; P=0.002), whereas it only marginally attenuates neovascularization in vimentin-null mice (29% inhibition; n=10; P=0.005) (FIG. 5), revealing that inhibition of capillary growth by WFA is mediated predominantly by vimentin. Interestingly, the vascularization response of vimentin-deficient mice is not as extensive as in wild-type mice, which is consistent with previous reports on impaired angiogenesis in vimentin deficiency.

WFA has been recently shown to bind annexin II in cancer cell lines, as shown by Falsey, R. R. et al., Actin microfilament aggregation induced by Withaferin A is mediated by annexin II, *Nat. Chem. Biol.* 2, 33-38 (2006), herein incorporated by reference. However, this 36 kDa protein is not detected in in vivo WFA-affinity purified proteins from human or bovine endothelial cells (FIG. 1b), nor was it detected by western blotting of NEUTRAVIDIN™-purified proteins in our studies (data not shown). Thus, differences in the construction of the biotinylated WFA analogs (e.g., inclusion of a long, linear hydrocarbon linker between the natural product and biotin), or their applications for target isolation (in vitro versus in vivo labeling), could account for different targets being bound to WFA. It is also possible that WFA has context-related, binding specificities for different targets in vivo, a speculation that will need to be rigorously tested.

Vimentin is the primary target of WFA in vivo, and this small molecule can perturb vimentin function. Use of a small molecule to inhibit vimentin function can serve as a complementary approach to classical genetic studies of disorders of IFs, shown in Bar, H., Strelkov, S. V., Sjoberg, G., Aebi, U. & Herrmann, H., The biology of desmin filaments: how do mutations affect their structure, assembly, and organisation?, *J. Struct. Biol.* 148, 137-152 (2004), herein incorporated by reference. Thus, WFA and derivative steroidal-lactones represent a useful chemical genetic tool for studies of the type-III IF proteins. As vimentin modulates the immune response and is overexpressed in prostate and other cancers, WFA holds great promise as a potential lead for the development of small molecule therapeutics.

Based on the foregoing experiments and test results, there are many potential applications for development of small molecule based probes and analogs. For example, the binding of the WFA probe can be used to modulate vimentin protein function and, thus, the binding pocket can serve as a novel target for the development of small molecule agonists or antagonists of vimentin function. In another use, one can monitor intracellular transport and localization of vimentin protein to different subcellular locations in vivo by conjugating a detection label, such as a fluorescent tag, radiolabel or biotin, to WFA. Since these probes bind selectively and covalently to vimentin, they allow one to follow this marker in a whole range of known tissues from a variety of proliferative diseases, such as cancer, arthritis, diabetes, etc., serving essentially as a sensitive diagnostic tool.

In another use, WFA-based analogs can be employed to more potently modify vimentin function and thereby generate new classes of pharmacological drugs for treatment of human diseases. In addition, the WFA-vimentin binding site information could be employed to probe similar binding sites in other IF proteins, for which the cysteine group is known to be present in a similar coiled coil domain of the IFs.

The following experimental conditions provide additional background and details regarding the aforementioned experiments, which support the present screening method as an effective method for identifying potential small molecule drugs and their respective binding sites.

All cell culture supplies were purchased from Gibco unless otherwise specified. Antibodies were from SantaCruz Biotechnology unless otherwise specified. WFA and 12-D WS were obtained from Chromadex and stock solutions were freshly prepared in DMSO. All cell reagents were purchased from Invitrogen.

HUVECs and BAECs cells were obtained from Cascade Biologicals and cultured according to vendor's protocols.

MCF-7 breast cancer cell line was obtained from ATCC and cultured in RPMI 1640 medium containing 10% Fetal Bovine Serum (FBS). MFT-16 cells from embryo fibroblasts of vimentin homozygous-deficient mice ($Vim^{-/-}$) and MFT-6 cells from embryo fibroblasts of wild-type ($Vim^{+/+}$) mice were obtained from Robert Evans (University of Colorado, Denver) and cultured in F12:DMEM (1:1) medium supplemented with 5% FBS. All cells were cultured in humidified incubators at 37° C.-5% $CO_2$ conditions.

Isolation of WFA-B-Binding Proteins by Affinity Chromatography.

The synthesis and chemical characterization of WFA-B, demonstration of its biological activity in endothelial cells, and use to identify biotinylated proteins from HUVECs was previously reported (Yokota 2006). For scale-up studies, BAECs were pre-incubated with DMSO or 5 µM WFA for 1 hour and subsequently treated with 5 µM WFA-B for 2 hours. Cells were washed in ice-cold phosphate buffered saline (PBS) and cytoplasmic extracts were prepared in Buffer A (5 mM Tris, pH 7.6, 50 mM NaF, 1% Triton X-100, 5 mM EGTA), supplemented with a proteinase inhibitor cocktail (Roche). After centrifugation, equal amounts of protein were pre-cleared on agarose beads (Sigma) to remove non-specific agarose-binding proteins. The beads were centrifuged and pre-cleared cell lysates were repeatedly loaded three times on columns containing NEUTRAVIDIN™-agarose beads (Pierce) to maximize immobilization of biotinylated proteins. After extensive washing with ice-cold Buffer A, bound biotinylated proteins were eluted in Laemeli gel loading buffer containing β-mercaptoethanol and fractioned by SDS-PAGE on 15×15 cm gels. Gels were stained with Coomassie blue dye and bands corresponding to 56 kDa, 51 kDa and 43 kDa protein were excised for mass spectrometric analysis.

Identification of Affinity Purified Proteins by LC-MS/MS.

All mass spectra reported in this disclosure were acquired by the University of Kentucky Mass Spectrometry Facility. Gel pieces were digested with trypsin, and LC/MS/MS spectra were acquired on a ThermoFinnigan LCQ "Classic" quadrupole ion trap mass spectrometer (Finnigan Co., San Jose, Calif.). Separations were performed with an HP 1100 high performance liquid chromatograph modified with a custom splitter to deliver 4 µl/min to a custom C18 capillary column (300 µm inner diameter×15 cm). Gradient separations consisted of a 2-minute isocratic step at 95% water and 5% acetonitrile (both phases contain 0.1% formic acid). The organic phase was increased to 20% acetonitrile over 8 minutes and then increased to 90% acetonitrile over 25 minutes; held at 90% acetonitrile for 8 minutes and then increased to 95% in 2 minutes; finally they were returned to the initial conditions in 10 minutes (total acquisition time 45 minutes with a 10 minute recycle time). Tandem mass spectra were acquired in a data-dependent manner. Three microscans were averaged to generate the data-dependent full-scan spectrum. The most intense ion was subjected to tandem mass spectrometry, and three microscans were averaged to produce the MS/MS spectrum. Masses subjected to the MS/MS scan were placed on an exclusion list for 2 minutes. Resulting MS-MS spectra were searched against mammalian proteins in the Swiss-Prot database using the Mascot search engine (Matrix Science).

3D Model of the Human Vimentin Fragment.

The initial coordinates of 2B human vimentin fragment used in our computational studies came from the X-ray crystal structure (pdb code: 1gk4.pdb) deposited in the Protein Data Bank. To encompass the structure of the protein environment surrounding the active residue Cys328, the missing residues of the 2A fragment (i.e. residues #313 to #327 in A and B helices) were built using the α-helical template structure and the automated homology modeling tool Modeler/InsightII software (Accelrys, Inc.). Then, the best 3D model was solvated in water and refined by performing a long-time molecular dynamics (MD) simulation in water.

Molecular Docking.

To explore the possible vimentin-ligand binding mode, the first step was to dock the ligand, i.e. WFA or 12-D WS, to vimentin tetramer fragment by virtue of their geometric complementarity. The molecular docking for each vimentin-ligand binding was carried out in the same way as previously done when studying other protein-ligand binding systems, as disclosed in Hamza, A. & Zhan, C.-G., How Can (−)-Epigallocatechin Gallate from Green Tea Prevent HIV-1 Infection? Mechanistic Insights from Computational Modeling and the Implication for Rational Design of Anti-HIV-1 Entry Inhibitors, *J. Phys. Chem. B* 110, 2910-2917 (2006), herein incorporated by reference.

A ligand-binding site was defined as that consisting of the residues within a sphere (with a radius of 20 Å) centered at Cys328 residue. The ligand was initially positioned at ~10 Å in front of Cys328 of the binding site. The initial docking calculations were performed on the ligand with the vimentin fragment binding site using the 'automatic docking' Affinity module of the InsightII package (Accelrys, Inc.). The Affinity methodology uses a combination of Monte Carlo type and simulated Annealing procedures to dock the guest molecule (the ligand) to the host (the receptor). The vimentin-ligand binding structure obtained from the initial docking was further refined by performing an MD simulation in a water bath.

Western Blotting Experiments.

After treatments, cells were washed in PBS and extracts having equal amounts of proteins were subjected to SDS-PAGE on 4-20% Tris-glycine gels (BioEpress) and transferred to Immun-Blot PVDF membrane (Bio-Rad) using standard techniques. Primary antibodies were diluted in 5% non-fat dry milk Tris buffered saline, 0.02% Tween-20 (NFDM-TBST) at the concentration of 1:500, and secondary antibodies were used at 1:1000 dilution. Blots were extensively washed in TBST buffer and developed using enhanced chemiluminescence method (Amersham) and exposed to x-ray film.

Transfection Studies.

MCF-7 cells were transfected with a pCMV6-XL5 vector containing the human vimentin cDNA under CMV promoter according to vendor instructions (Origene). Control samples were transfected with an empty vector (PCMV6-XL4). Transfected cells were allowed to recover for 12 hours and subsequently treated with 2 µM WFA for 18 hours. Equal amounts of protein lysates were then subjected to western blotting and probed with mouse monoclonal antibody against ubiquitin proteins.

Protein Transduction Studies.

Tetrameric vimentin (0.5 µg) (Cytoskeleton) was incubated with 10 µM WFA or an equivalent amount of vehicle (DMSO) for 1 hour at 37° C. to form protein-WFA adducts. Vimentin-WFA or vimentin alone (0.5 µg) were mixed with the CHARIOT™ protein transduction reagent (Active Motif) and incubated for 30 minutes at 24° C. to form complex according to instructions of manufacturer. The protein-CHARIOT™ complex was subsequently added to BAECs in serum-free medium and incubated for 1 hour at 37° C.-5% $CO_2$ conditions. Fresh complete medium was then added and cells were incubated for an additional 18 hours under normal culture conditions. Cells were processed for immunohistochemistry analysis, as described.

Apoptosis by Flow Cytometry.

To assess the apoptosis activity of WFA, embryonic fibroblast vimentin-deficient cell lines (Vim$^{-/-}$; MFT-16) and wild-type (Vim$^{+/+}$; MFT-6) cells were treated with 5 µM WFA or an equivalent amount of vehicle (DMSO) for 24 hours at 37° C.-5% $CO_2$ conditions in complete medium. Apoptotic cells were measured by using the VYBRANT™ Apoptosis Assay Kit (Molecular Probes) according to the manufacturer's instructions. Flow cytometric analysis was conducted at the University of Kentucky Core Flow Cytometry Center.

Cell Staining Procedures and Fluorescence Imaging.

After treatments, BAECs were washed with PBS and fixed with 4% paraformaldehyde for 5 minutes. Cells were then permeabilized with 0.1% Triton-X in PBS for 20 minutes at 4° C. and blocked for 30 minutes in 3% BSA to prevent nonspecific binding. Rabbit polyclonal vimentin antibody (Vim) or mouse monoclonal vimentin antibody (V9) was applied to cells for 1 hour at 24° C. at 1:400 dilution in PBS. After extensive washes with PBS, cells were incubated with anti-rabbit FITC-conjugated secondary antibody (1:500) or anti-mouse Texas Red-conjugated secondary antibody (1:500) for 30 minutes. After washing three times with PBS, cells labeled with Vim-antibody were incubated with phalloidin conjugated to Rhodamine (1:200) for 20 minutes. After extensive washes (1-2 hours), cells were visualized using a Nikon TE2000 microscope.

Transmission Electron Microscopy of Vimentin Filaments.

Tetrameric hamster vimentin was subjected to in vitro filament formation assays using vendor-supplied reagents and instructions (Vimentin Filament Biochemistry Kit, Denver, Colo.). Vimentin (0.5 mg/ml) was mixed with WFA (5 µM or 25 µM), DMSO or 12D-WS (25 µM) in filament polymerization buffer (170 mM NaCl final concentration) and incubated for 1 hour at 37° C. Protein was immediately fixed in 0.5% glutarldehyde and stained with uranyl acetate and applied to copper grids for EM staining (University of Kentucky Core Microscopy and Imaging Facilities). Over 100 grids for each treatment were viewed at 80 kV on a FEI Biotwin 12 transmission electron microscope and 25 representative images were collected. The experiment was repeated in entirety.

Enzyme Kinetic Studies.

$k_{association}$ values were determined as follows. Inhibitors were mixed with a fluorogenic peptide substrate and assay buffer (20 mM Tris (pH 8.0), 0.5 mM EDTA, and 0.035% SDS) in a 96-well plate. The chymotrypsin-like activity was assayed using the fluorogenic peptide substrates Suc-Leu-Leu-Val-Tyr-AMC (Sigma-Aldrich). Hydrolysis was initiated by the addition of bovine 20S proteasome, and the reaction was followed by fluorescence (360-nm excitation/460-nm detection) using a Microplate Fluorescence Reader (FL600; Bio-Tek Instruments, Inc., Winnoski, Vt.) employing the software KC4 v.2.5 (Bio-Tek Instruments, Inc., Winooski, Vt.). Reactions were allowed to proceed for 60-90 minutes, and fluorescence data were collected every 1 minute. Fluorescence was quantified as arbitrary units and progression curves were plotted for each reaction as a function of time. $k_{observed}/[I]$ values were obtained using PRISM program by nonlinear least squares fit of the data to the following equation: fluorescence=$v_s t+[(v_0-v_s)/k_{observed}][1-\exp(-k_{observed} t)]$, where $v_0$ and $v_s$ are the initial and final velocities, respectively, and $k_{observed}$ is the reaction rate constant. The range of inhibitor concentrations tested was chosen so that several half-lives could be observed during the course of the measurement. Reactions were performed using inhibitor concentrations that were <100-fold of those of the proteasome assayed.

Corneal Neovascularization Assays in Mice.

Vimentin homozygous-deficient mice (vim$^{-/-}$) and vimentin-heterozygous-deficient mice (vim$^{+/-}$) in the 129/Svev background were obtained from David Markovitz (University of Michigan Medical Center) and breeding colonies established at the University of Kentucky. All mice were housed in specific pathogen-free cages in designated lab animal housing facilities. Age-matched littermates were genotyped by polymerase chain reaction, as described, and vim$^{-/-}$ and vim$^{+/+}$ mice were employed for corneal vascularization experiments. In brief, mice between 4-6 weeks of age were anesthetized by intraperitoneal injection (i.p.) of ketamine and xylazine. Corneas were topically anesthetized by application of proparacain drop and 1 microliter drop of dilute 0.1 M sodium hydroxide was applied for 1 minute. The cornea was immediately washed extensively in saline solution and corneal and limbal epithelium gently removed by scraping with a blunt Tooke corneal knife. The cornea was topically treated with Atropine eye drop and covered with tobramycin and erythromycin antibiotic eye ointment. Upon recovery from anesthesia, mice were replaced in cages and monitored by trained personnel for resumption of normal activity. WFA (2 mg/kg solubilized in DMSO) or vehicle (DMSO) was injected intraperiteoneally in some groups of mice after their recovery from corneal injury, and subsequently every day after for a period of 10 days. Mice were humanely sacrificed and eyes enucleated. Mouse eyes were washed in PBS and dissected in half to obtain anterior segment half. The scleral tissue was carefully removed and corneal buttons were prepared. Corneal tissues were fixed in 100% acetone for 20 minutes, washed in PBS for 1 hour and blocked for 18 hours in 1% BSA-PBS at 4° C. Cornea whole mount staining was performed by incubating tissues in FITC-conjugated rat anti-mouse CD31 antibody (BD Pharmingen; 1:333 dilution in 1% BSA-PBS) for 12 hours. Excess stain was washed away by incubation for 24 hours at 4° C. in 1% BSA-PBS. Corneal whole mounts were affixed to glass slides, cover-slipped and photographed on a Nikon TE2000 microscope. Fluorescence was quantified by importing images in NIH ImageJ, as taught by Ambati, B. K. et al., Sustained inhibition of corneal neovascularization by genetic ablation of CCR5, *Invest. Opthalmol. Vis. Sci.* 44, 590-593 (2003), hereinafter incorporated by reference.

Although the invention has been described in considerable detail with respect to preferred embodiments, it will be apparent that the invention is capable of numerous modifications and variations, apparent to those skilled in the art, without departing from the spirit and scope of the claims.

The invention claimed is:

1. A method for generating a withanolide analog, comprising:

binding Withaferin A to a tag through a linker comprising glycine to provide the withanolide analog having the structure of wherein $R_a$ represents a glycine molecule covalently linked to a linker molecule, which linker molecule is covalently bonded to a tag, wherein the linker molecule comprises atoms not derived from the Withaferin A or the tag and wherein $R_a$ is covalently bonded to the Withaferin A via the glycine molecule of $R_a$.

2. The method of claim 1, wherein the tag is selected from a biotin moiety, a digoxigenin moiety, a fluorescent moiety, a BODIFY moiety, a radioactive compound, a luminescent reagent, and a quantum dot.

3. The method of claim 1, wherein the linker group is a $C_1$-$C_{20}$ long hydrocarbon chain linker.

4. The method of claim 1, wherein a target of the withanolide compound is vimentin.

5. The method of claim 1, wherein a target of the withanolide compound is an intermediate filament protein.

6. The method of claim 1, wherein the target of the withanolide compound is a fragment of a type III intermediate filament protein.

7. A withanolide analog having the structure of wherein $R_a$ represents a glycine molecule covalently linked to a linker molecule, which linker molecule is covalently bonded to a tag, wherein the linker molecule comprises atoms not derived from the withanolide compound or the tag and wherein $R_a$ is covalently bonded to the withanolide compound via the glycine molecule of $R_a$.

8. The withanolide analog of claim 7, wherein the tag is a biotin moiety.

9. The withanolide analog of claim 7, wherein the linker group is a $C_1$-$C_{20}$ long hydrocarbon chain linker.

10. The withanolide analog of claim 7, wherein a target of the withanolide analog is vimentin.

11. The withanolide analog of claim 7, wherein a target of the withanolide analog is a type III intermediate filament protein.

12. The withanolide analog of claim 7, wherein a target of the withanolide analog is a fragment of an intermediate filament.

13. The withanolide analog of claim 7, wherein the withanolide analog does not bind annexin II.

14. The withanolide analog of claim 7, wherein the tag is selected from a biotin moiety, a digoxigenin moiety, a fluorescent moiety, a radioactive moiety, a luminescent moiety, a BODIFY moiety, and a quantum dot.

15. The withanolide analog of claim 7, having the structure of

16. The withanolide analog of claim 7,
wherein Ra is selected from:
 (a) Glycine-Rd-Re, wherein
  (i) each Rd is independently a straight or branched alkyl with up to 12 carbons or aralkyl, and
  (ii) each Re is independently biotin, digoxigenin, BODIFY (8-chloromethyl-4,4-difluoro-1,3,5,7-tetramethyl-4-bora-3a,4a-diaza-s-indacene) succinate, or radioactive ligand; or
 (b) Glycine-C(=O)-Rd-Re, wherein
  (i) each Rd is independently a straight or branched alkyl with up to 12 carbons, aralkyl, or mono- di- tri- ethyleneglycol, and
  (ii) each Re is independently biotin, digoxigenin, BODIFY (8-chloromethyl-4,4-difluoro-1,3,5,7-tetramethyl-4-bora-3a,4a-diaza-s-indacene) succinate, or radioactive ligand; or
 (c) Glycine-C(=O)—X—NH—Re, wherein
  (i) each X is independently a straight or branched alkyl with up to 12 carbons or mono- di- tri- ethyleneglycol, and
  (ii) each Re is independently biotin, digoxigenin, BODIFY (8-chloromethyl-4,4-difluoro-1,3,5,7-tetramethyl-4-bora-3a,4a-diaza-s-indacene) succinate, or radioactive ligand; or
 (d) Glycine-(C=O)—Re, wherein
  each Re is independently Cy5.5 acetate, fluorescein acetate, 2-naphthoxy acetate, benzoyl benzyl acetate, phloro-acetophenone acetate, 4-methoxy-2-hydroxybenzoate, alexa succinate, coumarin acetate, 1-naphthyl, 1-, or 1,3- or, 1,3,5-methoxy-benzyl, 1 to 5 fluoro-benzyl, or piperazynyl.

\* \* \* \* \*

SEQUENCE LISTING

<160> NUMBER OF SEQ ID NOS: 14

<210> SEQ ID NO 1
<211> LENGTH: 41
<212> TYPE: PRT
<213> ORGANISM: Homo sapiens

-continued

```
<400> SEQUENCE: 1

Arg Gln Ala Lys Gln Glu Ser Thr Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 2
<211> LENGTH: 41
<212> TYPE: PRT
<213> ORGANISM: Pan troglodytes

<400> SEQUENCE: 2

Arg Gln Ala Lys Gln Glu Ser Thr Glu Tyr Arg Arg Gln Val Gln Ala
1               5                   10                  15

Pro Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 3
<211> LENGTH: 41
<212> TYPE: PRT
<213> ORGANISM: Macaca sp.

<400> SEQUENCE: 3

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 4
<211> LENGTH: 41
<212> TYPE: PRT
<213> ORGANISM: Cercopithecus aethiops

<400> SEQUENCE: 4

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 5
<211> LENGTH: 41
<212> TYPE: PRT
<213> ORGANISM: Macaca mulatta

<400> SEQUENCE: 5

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40
```

<210> SEQ ID NO 6
<211> LENGTH: 41
<212> TYPE: PRT
<213> ORGANISM: Sus scrofa

<400> SEQUENCE: 6

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 7
<211> LENGTH: 41
<212> TYPE: PRT
<213> ORGANISM: Canis lupus

<400> SEQUENCE: 7

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

His Gln Met Arg Glu Met Glu Glu Asn
        35                  40

<210> SEQ ID NO 8
<211> LENGTH: 41
<212> TYPE: PRT
<213> ORGANISM: Bos taurus

<400> SEQUENCE: 8

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 9
<211> LENGTH: 41
<212> TYPE: PRT
<213> ORGANISM: Mesocricetus auratus

<400> SEQUENCE: 9

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 10
<211> LENGTH: 41
<212> TYPE: PRT
<213> ORGANISM: Mus sp.

-continued

<400> SEQUENCE: 10

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 11
<211> LENGTH: 41
<212> TYPE: PRT
<213> ORGANISM: Rattus sp.

<400> SEQUENCE: 11

Arg Gln Ala Lys Gln Glu Ser Asn Glu Tyr Arg Arg Gln Val Gln Ala
1               5                   10                  15

Leu Thr Cys Glu Val Asp Ser Leu Lys Gly Thr Asn Glu Ser Leu Glu
            20                  25                  30

Arg Gln Met Arg Glu Met Glu Glu Asn
        35                  40

<210> SEQ ID NO 12
<211> LENGTH: 41
<212> TYPE: PRT
<213> ORGANISM: Gallus gallus

<400> SEQUENCE: 12

Arg Gln Ala Lys Gln Glu Ala Asn Glu Tyr Arg Arg Gln Ile Gln Ala
1               5                   10                  15

Leu Thr Cys Glu Val Asp Ser Leu Lys Gly Ser Asn Glu Ser Leu Glu
            20                  25                  30

Arg Gln Met Arg Glu Met Glu Glu Asn
        35                  40

<210> SEQ ID NO 13
<211> LENGTH: 41
<212> TYPE: PRT
<213> ORGANISM: Frog

<400> SEQUENCE: 13

Arg Gln Ala Lys Gln Glu Thr Ser Asp Phe Arg Arg Gln Ile Gln Ala
1               5                   10                  15

Leu Thr Cys Glu Val Asp Ser Leu Lys Gly Ser Asn Glu Ser Tyr Glu
            20                  25                  30

Arg Gln Met Arg Glu Met Glu Glu Asn
        35                  40

<210> SEQ ID NO 14
<211> LENGTH: 41
<212> TYPE: PRT
<213> ORGANISM: Trout

<400> SEQUENCE: 14

Arg Gln Ala Lys Gln Glu Ala Asn Glu Tyr Arg Arg Gln Val Gln Ala
1               5                   10                  15

Leu Thr Cys Glu Val Asp Ser Leu Lys Gly Thr Asn Glu Ser Met Glu
            20                  25                  30

Arg Gln Met Arg Glu Leu Glu Glu Ser
        35                  40